United States Patent Office 3,449,403
Patented June 10, 1969

3,449,403
NOVEL ACRYLATES
Arthur A. Patchett, Cranford, Edward F. Rogers, Middletown, and Robert L. Clark, Woodbridge, N.J., assignors to Merck & Co., Inc., Rahway, N.J., a corporation of New Jersey
No Drawing. Filed Apr. 6, 1966, Ser. No. 540,495
Int. Cl. C07c *101/44*
U.S. Cl. 260—471                    4 Claims

ABSTRACT OF THE DISCLOSURE

Novel loweralkyl-α-carboalkoxy-β-3,4-disubstituted anilino acrylates obtained by the reaction of a 3,4-disubstituted aniline with diloweralkyl loweralkoxymethylenemalonate. These acrylates are intermediates in the synthesis of 4 - hydroxy - 6,7 - disubstituted quinoline - 3 - carboxylates which latter substances have anticoccidial activity.

---

This invention relates to new chemical compounds. More specifically, it relates to novel quinoline-3-carboxylates useful in combating the poultry disease coccidiosis. Still more specifically, it is directed to loweralkyl-6-substituted-7-substituted amino 4-hydroxy-quinoline-3-carboxylates, intermediates thereof and their method of preparation. It is also concerned with the use of the carboxylates as coccidiostats and novel anticoccidial compositions containing them.

Coccidiosis is a widespread poultry disease involving the invasion of caecal and intestinal mucosa by coccidia, specifically protozoan parasites of the genus Eimeria. The most important of these species are *E. maxima*, *E. acervulina*, *E. tenella*, *E. necatrix*, *E. brunetti*, *E. praecox* and *E. mitis*. When left untreated, the severe form of the disease leads to poor weight gain, reduced feed efficiency, reduced egg production and high mortality. For these reasons, the control cocciosis is highly important to the poultry industry.

According to the present invention, it has been found that certain 7-substituted amino-4-hydroxyquinoline-3-carboxylates are highly effective in the treatment and prevention of coccidiosis. An object of this invention, therefore, is to provide new chemical compounds useful in the control of coccidiosis. A further object is to provide novel compounds useful as intermediates in preparing the coccidiostats. Another obect is to provide novel compositions containing the active compounds. A still further object is provision of methods of making such compounds and compositions. An additional object is provision of methods of combating coccidiosis by administering to poultry minor amounts of the anticoccidial substances described herein. Further objects will become evident from the following discussion of the invention.

In accordance with the present invention, it has now been found that compounds represented by the structural Formula I possess significant anticoccidial activity.

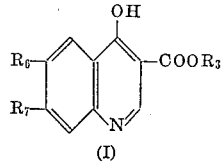
(I)

where $R_3$ is loweralkyl, $R_6$ is haloalkoxy having 2–4 carbon atoms, loweralkoxy, and loweralkyl, and $R_7$ is a substituted amino group.

The substituent $R_3$ in the above formula represents propyl, butyl, isobutyl and the like. $R_6$ represents a loweralkyl group, such as those mentioned above in defining $R_3$, and a haloalkoxy group having 2–4 carbon atoms, such as haloethoxy, halopropoxy, halobutoxy and the like. This haloalkoxy substituent may contain halogen groups such as chloro, bromo, fluoro, and iodo. Moreover, the haloalkoxy group at the 6-position may contain halogen moieties which may be the same or different. Preferably, such haloalkoxy group also has two fluoro groups on thealpha carbon and at least one hydrogen on the beta carbon. It is also preferred that these compounds contain in this haloalkoxy group no more than one halogen other than fluorine. Loweralkoxy groups are also represented by the symbol $R_6$. Such substituent may therefore be a methoxy, ethoxy, propoxy, isopropoxy, butoxy, or isobutoxy group, and the like.

A significant feature of the anticoccidial compounds of this invention is the substituent at the 7-position ($R_7$) of the quinoline carboxylates defined by Formula I above. $R_7$ represents a substituted amino group which may be depicted by the formula $NR_1R_2$. The symbols $R_1$ and $R_2$ represent alkyl, preferably loweralkyl such as methyl, ethyl, propyl, isopropyl, and the like, aryl, such as phenyl and the like, aralkyl, such as benzyl and substituted benzyl and the like, and loweralkenyl, such as allyl and the like. $NR_1R_2$ also represents cyclic amino groups such as morpholino, piperidino, pyrollidino, and the like.

As illustrative of the compounds of this invention there may be mentioned methyl 4-hydroxy-6-(α,α,β,γ,γ,γ-hexafluoropropyloxy) - 7 - dimethylamino - quinoline - 3 - carboxylate, ethyl 4 - hydroxy - 6 - (α,α - difluoro - β - chloroethoxy) - 7 - morpholino - quinoline - 3 - carboxylate, methyl 4-hydroxy-6-isopropyl-7-diethylamino-quinoline-3-carboxylate, ethyl 4-hydroxy-6-(α,α,β-trifluoro-β-chloroethoxy) - 7 - diethylamino - quinoline - 3 - carboxylate, methyl 4-hydroxy-6-ethyl-7-diethylaminoquinoline-3-carboxylate, ethyl 4-hydroxy-6-n-propyl-7-diphenylamino - quinoline - 3 - carboxylate, methyl 4 - hydroxy-6 - (α,α,β - trifluoro - β - iodoethoxy) - 7 - diisopropylamino - quinoline - 3 - carboxylate, methyl 4 - hydroxy-6-methyl-7-diethylamino-quinoline-3-carboxylate, methyl 4 - hydroxy - 6 - isopropoxy - 7 - dimethylamino - quinoline-3-carboxylate, methyl 4-hydroxy-6-n-propoxy-7-diethylmaino-quinoline-3-carboxylate, and methyl 4-hydroxy - 6 - n - propoxy - 7 - di - n - propylamino - quinoline-3-carboxylate.

The quinoline-3-carboxylates defined by Formula I above are prepared by treating a 3-substituted amino-4-substituted aniline with a diloweralkyl loweralkoxy methylene malonate and heating the intermediate obtained thereby.

This reaction may be represented as follows:

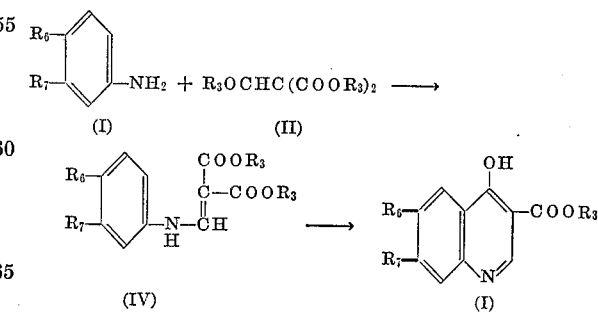

where $R_3$, $R_6$, and $R_7$ are as earlier defined.

In the first step of the above synthesis, a substituted aniline of Formula I above is treated with a diloweralkyl loweralkoxymethylenemalonate of Formula II in solvent. Solvents such as alcohols, e.g. loweralkanols such as ethanol and isopropanol, ethers such as diethylether, dioxane, diethylene glycol, dimethylether, ethylene glycol dimethylether, and the like are useful in this regard. The reactants are preferably present in a molar ratio of 1:1 but this may vary somewhat without substantial adverse effect on the quantity of acrylate (IV) to be obtained. This reaction may be carried out at 40°–120° C. but temperatures in the range of 80°–100° C. are preferred.

The acrylate may then be converted to the quinoline-3-carboxylate by treatment with heat. Temperatures of from 200° C.–300° C. are satisfactory with 240°–260° C. being preferred. Although not essential to the success of this process, it is preferred that a solvent be employed to better satisfy heat transfer requirements and to improve the yield of product. Solvents which might be used in this regard include dimethylsulfone, dodecylbenzene, biphenyl, diphenylether, and other similar high-boiling solvents.

In accordance with another aspect of the invention, the novel quinoline-3-carboxylates described according to Formula I above are prepared by esterifying the corresponding quinoline-3-carboxylic acid. This provides an additional method for preparing the novel carboxylates which is at this times more readily performed than that earlier described. This process is effected by treating the acid with a strong concentrated mineral acid such as phosphoric acid, hydrochloric acid, sulphuric acid, and the like, and an appropriate loweralkanol. The temperature should be maintained at about 75°–150° C., conveniently at about 100° C. for several hours. The remaining alkanol may be removed in vacuo and the residue is worked up by conventional techniques such as neutralization, solution and crystallization.

According to still another method of the present invention, the compounds of Formula I are preparable from the corresponding quinoline-3-carboxylic acid halide. The acid halide is treated with a loweralkanol, e.g. methanol, at 40°–160° C. The reaction mixture may then be filtered. The carboxylate product is obtained by cooling the filtrate. Solution, recrystallization, charcoal treatment, and the like may be used in purification of this material.

In accordance with an additional aspect of this invention, there are prepared 7-substituted amino 4-hydroxyquinolines of the formula

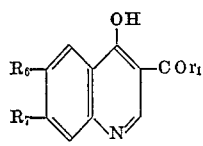

where $r_1$ represents hydroxy and halo and $R_6$ and $R_7$ are as earlier defined. The quinoline-3-carboxylic acids are obtainable from the compounds of Formula I by heating the latter with dilute sodium hydroxide and adding the resulting mixture to mineral acid in alcohol, e.g. hydrochloric acid in methanol. The acid chloride is derived from the acid by, for example, treatment with thionyl chloride at about 80° C.

The 3-substituted amino 4-substituted aniline starting materials of this invention are prepared according to known methods. For example, an aniline starting material having a diloweralkyl or diloweralkenyl amino group at the 3-position and a loweralkoxy or haloloweralkoxy group at the 4-position is prepared from an orthonitrophenol by treating said phenol with an alkylating agent such as the appropriate alkene-1, to obtain the orthoalkoxynitrobenzene or orthohaloalkoxynitrobenzene, preferably at 60° or 150° C., at a pressure preferably of 2 atmospheric gauge. This compound is then reduced to the corresponding aniline by treatment by hydrogenation with palladium as catalyst. This orthosubstituted aniline is then arylated, alkylated or alkenylated with triaryl, trialkyl, triloweralkyl or triloweralkenyl phosphate. The resulting orthohaloalkoxy or orthoalkoxy-substituted-amine is then nitrated with sulfuric and nitric acid, and the resulting disubstituted nitrobenzene is converted to the aniline starting materials by hydrogenation using palladium as catalyst. Many of the haloalkene reactants are commercially available. Others may be prepared by standard methods known in the art, such as that described in the book Chemistry of Organic Fluorine Compounds by Milos Hudlicky (MacMillan & Co., 1962) on pp. 128–133. The starting materials having as the substituted-amino group a cyclic amino moiety may be prepared from the corresponding orthocyclicaminophenol, which are known compounds. A procedure similar to that utilized above in preparation of the diloweralkyl and diloweralkenyl amino compounds may be used including alkylation of the hydroxy moiety and nitration of the disubstituted benzene. The aline starting materials having a loweralkoxy group at the 4-position are prepared from the corresponding ortho-substituted aminophenol by converting the phenol to its sodium salt and alkylating the resulting salt with the appropriate loweralkyl halide, e.g. a loweralkyl bromide.

According to the present invention, it has been found that the compounds of Formula I above are highly effective for the treatment or prevention of coccidiosis. For this purpose, they are administered to poultry as a component of the feed or drinking water.

Although every carboxylate within the purview of this invention does not have the same degree of anticoccidial efficacy, all are active. The amount of active agent necessary for adequate control of the disease will vary with the severity of infection, the duration of treatment and, as indicated above, the particular compound employed as the coccidiostat.

It is one aspect of this invention to provide novel compositions in which the compounds defined by Formula I are present as the active anticoccidial ingredient. Such compositions comprise the quinoline-3-carboxylates intimately dispersed in or admixed with an inert carrier or diluent. By an inert carrier is meant one that is essentially nonreactive with the active anticoccidial ingredient and that may be administered with safety to the animals. In the case of solid compositions, the carrier or diluent is preferably one that is orally ingestible and that is or may be an ingredient of the animal feed. Preferred drinking water formulations are water soluble powders, aqueous suspensions, or solutions.

The compositions which are one of the preferred features of the invention are feed supplements in which the active anticoccidial ingredient is present in relatively large amounts in a poultry feed additive. Diluents which are normally employed for these animal feed supplements are solid orally ingestible poultry feed additives such as distillers' dried grains, corn meal, citrus meal, crushed limestone, and the like. The diluent preferred have nutritive value to the poultry and are normal ingredients of the finished feed. These supplements are incorporated in the poultry feed either directly or in an intermediate dilution or blending step. These premixes or feed supplements may contain about 5–50% by weight of the active ingredient.

Examples of typical feed supplements containing a quinoline-3-carboxylate of this invention are as follows:

Pounds
(A) Methyl 4 - hydroxy - 6-(β-chloro-α,α,β-trifluoroethoxy) - 7-diethylamino-quinoline-3-carboxylate __ 10
Corn meal _____ 90
(B) Ethyl 4 - hydroxy - 6-(n-propyl)-7-diethylaminoquinoline-3-carboxylate _____ 8
Distillers' dried grains _____ 92

Finished feeds may be a mash containing ground grain, animal and vegetable proteins, mineral and vitamin concentrates, or it may be a broiler feed containing a large proportion of ground yellow corn together with other nutritive substances such as fish meal, soybean oil meal, meat products, minerals and vitamins. Feed levels of drug of from about 0.0005% to about 0.05% by weight are effective in controlling coccidiosis, with concentrations of about 0.0025% to 0.025% by weight of feed being preferred. It should be understood that high feed levels within these ranges may be employed when using the compounds therapeutically for relatively short periods of time whereas lower feed levels are useful when the compounds are used prophylactically. It is desirable to employ the lowest levels that afford adequate control of the disease to minimize risk of side effects that might appear on prolonged feeding of the compounds. When the active agents are administered by way of the drinking water, somewhat lower levels than those in feed will be satisfactory since the birds drink about twice as much as they eat. The use of the active agent in drinking water is made more practically useful by addition to the water for a suspending agent such as acacia, tragacanth, Veegum (colloidal magnesium-aluminum silicate, R. E. Vanderbilt Co.), carboxypolymethylene, algins, methylcellulose, hydroxyethylcellulose and others, which promotes even distribution of the water-insoluble material.

One or more of the quinoline-3-carboxylates defined by Formula I may be used as the sole active agent or it may be used in conjunction with other coccidiostats. Such mixtures may be used for the purpose of utilizing the primary effectiveness of each compound against a particular species of coccidia. It has now been found that the present compounds are highly effective against $E.$ $brunetti$ and $E.$ $tenella.$ For the purpose of producing a broad spectrum coccidiostat composition, these 4-hydroxy-quinoline-3-carboxylates may accordingly be admixed with a compound highly efficacious in treating another variety of the disease.

The following examples are given for the purpose of illustration and not by way of limitation.

EXAMPLE 1

Methyl 4-hydroxy-6-($\alpha,\alpha,\beta$-trifluoro-B-chloroethoxy)-7-diethylamino-quinoline-3-carboxylate 2 grams of 3-diethylamino-4-($\alpha,\alpha,\beta$-trifluoro-$\beta$-chloroethoxy)-aniline is added to 1.6 g. of dimethylmethoxymethylene malonate and the solution is heated on the steam bath until the solvent is evaporated. The residue, methyl - $\alpha$ - carbmethoxy - $\beta$-[3-diethylamino-4-($\alpha,\alpha,\beta$-trifluoro-$\beta$-chloroethoxy)-anilino]-acrylate, is added to 100 ml. of dodecyl benzene with stirring at 250° C. After one-half hour, the mixture is cooled and the solid filtered off. The solid is added to hot acetone and crystallized therefrom to provide methyl 4-hydroxy-6-($\alpha,\alpha,\beta$-trifluoro-$\beta$-chloroethoxy) - 7 - diethylamino-quinoline-3-carboxylate; M.P. 258°–260° C.

Ethyl 4 - hydroxy-6-($\alpha,\alpha,\beta$-trifluoro-$\beta$-chloroethoxy)-7-diethylamino-quinoline-3-carboxylate (M.P. 239°–242° C.) is prepared using the above procedure when diethylethoxymethylenemalonate is used in place of dimethylmethoxymethylenemalonate.

When the above process is carried out and 3-morpholino - 4 - ($\alpha,\alpha,\beta$-trifluoro-$\beta$-chloroethoxy)-aniline, 3-piperidino - 4 - ($\alpha,\alpha,\beta$ - trifluoro-$\beta$-chloroethoxy)-aniline, or 3-pyrollidino - 4 - ($\alpha,\alpha,\beta$-trifluoro-$\beta$-chloroethoxy)-aniline is used in place of 3-diethylamino-4-($\alpha,\alpha,\beta$-trifluoro-$\beta$-chloroethoxy)-aniline, there is obtained methyl 4-hydroxy-6-($\alpha,\alpha,\beta$ - trifluoro-$\beta$-chloroethoxy)-7-morpholino-quinoline-3-carboxylate (M.P. 278°–283° C.; ethyl ester, 276°–284° C.), methyl 4-hydroxy-6-($\alpha,\alpha,\beta$-trifluoro-$\beta$-chloroethoxy)-7-piperidino-quinoline-3-carboxylate (M.P. 275°–285° C.; ethyl ester, 261°–270° C.), or methyl 4-hydroxy-6 - ($\alpha,\alpha,\beta$ - trifluoro - $\beta$-chloroethoxy)-7-pyrollidino-quinoline-3-carboxylate (M.P. 286°–390° C.; ethyl ester, 285°–290° C.), respectively.

EXAMPLE 2

Methyl 4-hydroxy-6-($\alpha,\alpha,\beta$-trifluoro-$\beta$-chloroethoxy)-7-dimethylamino-quinoline-3-carboxylate To 2.2 g. of dimethylmethoxymethylenemalonate is added 3.2 grams of 3-dimethylamino-4-($\alpha,\alpha,\beta$-trifluoro-$\beta$-chloroethoxy)-aniline in 50 ml. of methanol. The mixture is heated on a steam bath for three hours. The solvent is removed in vacuo leaving methyl $\alpha$-carbmethoxy-$\beta$-[3-dimethylamino - 4 - ($\alpha,\alpha,\beta$-trifluoro-$\beta$-chloroethoxy)-anilino]-acrylate. This product is added to 45 ml. of dodecyl benzene at 250° C. and the mixture is maintained at this temperature for one half hour. The mixture is allowed to cool to room temperature and the product, methyl 4-hydroxy - 6 - ($\alpha,\alpha,\beta$ - trifluoro-$\beta$-chloroethoxy)-7-dimethylamino-quinoline-3-carboxylate, is obtained; M.P. 287° 288° C.

When the above process is carried out and diethylethoxymethylenemalonate is used in place of dimethylmethoxy methylenemalonate, ethyl 4-hydroxy-6-($\alpha,\alpha,\beta$-trifluoro - $\beta$ - chloroethoxy) - 7-dimethylamino-quinoline-3-carboxylate is obtained; M.P. 275°–278° C.

When the above process is carried out and 3-dipropylamino - 4 - ($\alpha,\alpha,\beta$-trifluoro-$\beta$-chloroethoxy)-aniline, 3-dimethylamino-4-($\alpha,\alpha$-difluoro-$\beta$-chloroethoxy-aniline, 3-diethylamino-4-($\alpha,\alpha,\gamma,\gamma,\gamma$-pentafluoropropoxy)-aniline, or 3 - morpholino-4-($\alpha,\alpha,\beta$-trifluoro-$\beta$-iodoethoxy)-aniline is used in place of 3-dimethylamino-4-($\alpha,\alpha,\beta$-trifluoro-$\beta$-chloroethoxy)-aniline, there is obtained methyl 4-hydroxy-6 - ($\alpha,\alpha,\beta$ - trifluoro - $\beta$-chloroethoxy)-7-dipropylamino-quinoline-3-carboxylate (M.P. 215°–225° C.; ethyl ester, 205°–207° C.); methyl 4-hydroxy-6-($\alpha,\alpha$-difluoro-$\beta$-chloroethoxy) - 7-dimethylamino-quinoline-3-carboxylate; methyl 4-hydroxy-6-($\alpha,\alpha,\gamma,\gamma,\gamma$-pentafluoropropoxy)-7-diethylamino-quinoline-3-carboxylate; or methyl 4-hydroxy-6 - ($\alpha,\alpha,\beta$ - trifluoro-$\beta$-iodoethoxy)-7-morpholino-quinoline-3-carboxylate, respectively.

EXAMPLE 3

Methyl 4-hydroxy-6-isopropoxy-7-dimethylamino-3-quinoline-carboxylate

To a solution of 3-dimethylamino-4-isopropoxy-aniline in 75 ml. methanol is added 11 g. of dimethylmethoxymethylenemalonate. The solvents are removed and the residue heated on the steam bath for one hour to give methyl $\alpha$ - carb-methoxy - $\beta$ - (3-dimethylamino-4-isopropoxy-anilino)acrylate. This oil residue containing the acrylate is added to 175 ml. of dodecylbenzene, heated to 250° C. and after 20 minutes the mixture is cooled and the separated material, methyl 4-hydroxy-6-isopropoxy-7-dimethylamino-3-quinoline-carboxylate, is crystallized from dimethyl formamide-ether (1:1), M.P. 244°–246° C.

When the above process is carried out and 3-diethylamino-4-n-propyl-aniline, 3-dimethylamino-4-isobutoxy-aniline, 3-diethylamino-4-isopropoxy-aniline, or 3-dipropylamino-4-isobutyl-aniline is used in the above process in place of 3-dimethylamino-4-isopropoxy-aniline, there is obtained methyl 4-hydroxy-6-n-propyl-7-diethylamino-quinoline-3-carboxylate (M.P. 195°–200° C.; ethyl ester, 204°–206° C.); methyl 4-hydroxy-6-n-isobutoxy-7-dimethylamino - quinoline-3-carboxylate (M.P. 246°–247° C.); methyl 4-hydroxy-6-isopropoxy-7-diethylamino-quinoline-3-carboxylate, or methyl 4-hydroxy-6- isobutyl-7-dipropylamino-quinoline-3-carboxylate, respectively.

When the above process is carried out and 3-dibenzylamino-4-isopropoxy-aniline, 3-diallylamino-4-isopropoxy-aniline, or 3-diphenylamino-4-isopropoxy-aniline is used in place of 3-dimethylamino-4-isopropoxy-aniline, methyl 4-hydroxy-6-isopropoxy-7-dibenzylamino-quinoline-3-carboxylate, methyl 4-hydroxy-6-isopropoxy-7-diallyl-amino-quinoline-3-carboxylate, or methyl 4-hydroxy-6-isopropoxy-7-diphenylamino-quinoline-3-carboxylate respectively, are obtained.

EXAMPLE 4

Ethyl 4-hydroxy-6-isopropoxy-7-dimethylamino-quinoline-3-carboxylate

To a suspension of 0.6 g. of 4-hydroxy-6-isopropoxy-7-dimethylamino-quinoline-3-carboxylic acid in 20 ml. of absolute ethanol is added 1.5 ml. of concentrated sulfuric acid. The resulting solution is heated on the steam bath for 20 hours. Most of the ethanol is removed by evaporation in vacuo. The residue is cooled and neutralized with 10% sodium carbonate. The precipitate is separated and crystallized from a 1:1 ethanol-water mixture.

When the above process is carried out and 4-hydroxy-6-isopropoxy-7-diethylamino-quinoline-3-carboxylic acid, 4 - hydroxy - 6-isopropoxy-7-diphenylamino-quinoline-3-carboxylic acid, 4-hydroxy-6-n-propyl-7-dibenzylamino-quinoline-3-carboxylic acid, 4-hydroxy-6-($\alpha,\alpha,\beta$-trifluoro-$\beta$ - chloroethoxy) - 7-morpholino-quinoline-3-carboxylic acid, 4-hydroxy-6-n-butoxy-7-piperidino-quinoline-3-carboxylic acid, or 4-hydroxy-6-isopropoxy-7-diallylamino-quinoline-3-carboxylic acid issued in place of 4-hydroxy-6 - isopropoxy - 7-dimethylamino-quinoline-3-carboxylic acid, there is obtained ethyl 4-hydroxy-6-isopropoxy-7-diethylamino-quinoline-3-carboxylate, ethyl 4-hydroxy-6-isopropoxy-7-diphenylamino-quinoline-3-carboxylate, ethyl 4 - hydroxy - 6-n-propyl-7-dibenzylamino-quinoline-3-carboxylate, ethyl 4-hydroxy-6-($\alpha,\alpha,\beta$-trifluoro-$\beta$-chloroethoxy) - 7 - morpholino quinoline-3-carboxylate, ethyl 4-hydroxy - 6-n-butoxy-7-piperidino-quinoline-3-carboxylate or ethyl 4-hydroxy-6-isopropoxy-7-diallylamino-quinoline-3-carboxylate, respectively.

When the above process is carried out and isopropanol is used in place of ethanol, there is obtained isopropyl 4 - hydroxy - 6 -isopropoxy - 7 - dimethylamino - quinoline-3-carboxylate.

EXAMPLE 5

Ethyl 4-hydroxy-6-isopropoxy-7-diethylamino-quinoline-3-carboxylate 2 g. of 4-hydroxy-6-isopropoxy-7-diethylamino-quinoline-3-carboxylic acid is refluxed in benzene with a molar equivalent of thionyl chloride for 8 hours. The resulting acid chloride in 40 ml. of methanol is heated on a steam bath at reflux for 5 hours. The reaction mixture is filtered while still hot and the filtrate is allowed to cool. The solid which separates is filtered, washed with water, and recrystallized from dimethyl formamide to give ethyl 4-hydroxy-6-isopropoxy-7-diethylamino-quinoline-3-carboxylate.

When the above process is carried out and n-propanol is used in place of methanol, there is obtained n-propyl 4 - hydroxy - 6 - isopropoxy - 7 - diethylamino - quinoline-3-carboxylate.

When the above process is carried out and 4-hydroxy-6-isopropoxy-7-diethylamino-quinoline-3-carboxylic acid, 4 - hydroxy - 6 - isopropoxy - 7 - diphenylamino - quinoline-3-carboxylic acid, 4-hydroxy-6-n-propyl-7-dibenzylamino-quinoline-3-carboxylic acid, 4-hydroxy-6-($\alpha,\alpha,\beta$-trifluoro-$\beta$-chloroethoxy)-7-morpholino-quinoline-3-carboxylic acid, 4-hydroxy-6-n-butoxy-7-piperidino-quinoline-3-carboxylic acid, or 4-hydroxy-6-isopropoxy-7-diallylamino-quinoline-3-carboxylic acid is used in place of 4-hydroxy - 6 - isopropoxy - 7 - diethylamino - quinoline - 3-carboxylic acid, there is obtained methyl 4-hydroxy-6-isopropoxy-7-diethylamino-quinoline-3-carboxylate, methyl 4 - hydroxy - 6 - isopropoxy - 7 - diphenylamino - quinoline-3-carboxylate, methyl 4-hydroxy-6-n-propyl-7-dibenzylamino-quinoline-3-carboxylate, methyl 4-hydroxy-6-($\alpha,\alpha,\beta$-trifluoro - $\beta$ - chloroethoxy) - 7 - morpholino - quinoline-3-carboxylate, methyl 4-hydroxy-6-n-butoxy-7-piperidino-quinoline-3-carboxylate or methyl 4-hydroxy-6-isopropoxy-7-diallylamino-quinoline-3-carboxylate, respectively.

EXAMPLE 6

One mole of o-diethylaminophenol in dimethyl formamide is admixed with sodium hydride (1 mol). To the resulting solution is slowly added n-propyl bromide (1 mol). The resulting mixture is then heated on a steam bath for 2 hours, added to water, and the entire mixture is extracted with ethyl ether. The ether is extracted with sodium hydroxide (2.5 N) and the ether solution evaporated to provide o-n-propoxy-N,N-diethyl aniline.

This product is treated with 20 ml. of concentrated sulfuric acid at 0° C. and 5 ml. of fuming nitric acid. The mixture is poured onto ice and neutralized with sodium carbonate to obtain 3-diethylamino-4-n-propoxy nitrobenzene. This compound is added to 40 ml. of methanol containing 1 g. of 5% palladium on carbon and hydrogen is passed through the mixture. The catalyst is filtered off and the resulting solution concentrated to provide 3-diethylamino-4-n-propoxy aniline.

When o-diallylaminophenol, o-diphenylaminophenol, o-morpholinophenol, or o-dibenzylaminophenol is used in place of o-diethylaminophenol or isobutyl bromide is used in place of n-propyl bromide, there is obtained 3-diallylamino-4-n-propoxy aniline, 3-diphenylamino-4-n-propoxy aniline, 3-morpholino-4-n-propoxy aniline, 3-dibenzylamino-4-n-propoxy aniline or 3-diethylamino-4-isobutoxy aniline.

EXAMPLE 7

2.8 g. of o-nitrophenol in 100 ml. of dimethyl formamide containing 11 g. of sodium methoxide is alkylated with 3.0 g. of chlorotrifluoroethylene by heating in a sealed vessel at 100° C. for 5 hours. The mixture is poured into water, the product extracted with ether, and the ether washed with water and sodium hydroxide and water again. The product, o-($\alpha,\alpha,\beta$-trifluoro-$\beta$-chloroethoxy)-nitrobenzene, is obtained by evaporation.

This product is hydrogenated in 150 ml. of methanol using 1 g. of palladium on charcoal (5%) as catalyst. The resulting aniline is stirred and heated with 29 ml. of triethyl phosphate to 235°–240° C. The temperature is then maintained at about 220° C. for 3 hours. The mixture is cooled and a solution of 22 g. of sodium hydroxide in 100 ml. water is added and the resulting mixture heated under reflux for about 2 hours. The mixture is diluted with about 200 ml. of water and extracted with ether several times. The combined ether solution is washed with water, dried, the ether removed and the product is distilled at 1 min. at 80°–90° C.

In a flask equipped for stirring is placed 50 ml. of concentrated sulfuric acid. It is cooled to −10° C. while 17 g. of the above compound is added. This solution is kept at −10° C. while a mixture of 22 ml. concentrated sulfuric acid and 5 ml. of concentrated nitric acid is slowly added. The mixture is kept at −10° C. for about one half hour, then allowed to warm to 0° C., poured into water and neutralized with sodium carbonate. The product is extracted into ether which is washed, and dried. The ether is evaporated and the product distilled off at 1.0 min. pressure at 135°–140° C. This product, 3-diethylamino - 4 - ($\alpha,\alpha,\beta$ - trifluoro - $\beta$ - chloroethoxy) - nitrobenzene, is hydrogenated as before to provide 3-diethylamino - 4 - ($\alpha,\alpha,\beta$ - trifluoro - $\beta$ - chloroethoxy) - aniline. When the above process is carried out and the appropriate loweralkene-1 or haloloweralkene-1 is used in place of chlorotrifluoroethylene or if an appropriate aryl, aralkyl, loweralkyl or loweralkenyl phosphate is used in place of triethylphosphate, corresponding disubstituted aniline starting materials for this invention are prepared.

It should be understood that although this invention has been described with reference to particular embodiments thereof, changes and modifications may be made which are within its intended scope and it should be limited only by the language of the appended claims.

We claim:
1. A compound of the formula

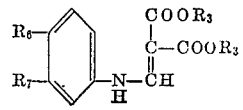

where $R_3$ is loweralkyl; $R_6$ represents loweralkyl, loweralkoxy, or haloloweralkoxy having 2–4 carbon atoms; and $R_7$ is $NR_1R_2$ where $R_1$ and $R_2$ represent loweralkyl, phenyl, benzyl, and loweralkenyl.

2. The compound of claim 1 wherein $R_3$ is methyl or ethyl, $R_6$ is loweralkyl and $R_1$ and $R_2$ represent loweralkyl.

3. The compound of claim 1 wherein $R_3$ is methyl, $R_6$ is n-propyl, and $R_1$ and $R_2$ each represent ethyl.

4. The compound of claim 1 wherein $R_3$ is ethyl, $R_6$ is n-propyl, and $R_1$ and $R_2$ each represent ethyl.

References Cited

FOREIGN PATENTS 6,500,850  7/1965  Netherlands.

LORRAINE A. WEINBERGER, *Primary Examiner.*

A. THAXTON, *Assistant Examiner.*

U.S. Cl. X.R.

167—53.1; 260—287